United States Patent [19]

Miyanaga

[11] Patent Number: 5,050,286

[45] Date of Patent: Sep. 24, 1991

[54] DRIVING MECHANISM FOR ANCHOR

[75] Inventor: Masaaki Miyanaga, Ashiya, Japan

[73] Assignee: Kabushiki Kaisha Miyanaga, Miki, Japan

[21] Appl. No.: 407,110

[22] Filed: Sep. 14, 1989

[51] Int. Cl.⁵ .............................................. B25B 27/14
[52] U.S. Cl. ........................................ 29/275; 29/254; 173/90
[58] Field of Search ................. 29/275, 280, 254, 255; 173/90, 91

[56] References Cited

U.S. PATENT DOCUMENTS 3,883,316  5/1975  Mason ............................... 29/275 X
4,627,140 12/1986  Davis .
4,845,827  7/1989  Vandenmast et al. ................ 29/280

FOREIGN PATENT DOCUMENTS 0063679 11/1982 European Pat. Off. .
0302202  2/1989 European Pat. Off. .
3524284  1/1987 Fed. Rep. of Germany .
2035182  6/1980 United Kingdom .
WO89/00648 1/1989 World Int. Prop. O. .

Primary Examiner—Timothy V. Eley
Assistant Examiner—Willmon Fridie, Jr.
Attorney, Agent, or Firm—Marshall, O'Toole, Gerstein, Murray & Bicknell

[57] ABSTRACT

Apparatus in accordance with this invention comprises a first part adapted to be positioned in engagement with an expander of an anchor bolt, a second part adapted to be engaged by a hammer drill, and a coupling between the first and second parts. The coupling includes a guide adapted to engage a bolt of the expander and a release normally connecting the second and first parts. The guide engages the release and holds the release in engagement with the first and second parts during driving operation but disengages the release after the expander has moved a preset distance relative to the bolt.

4 Claims, 4 Drawing Sheets

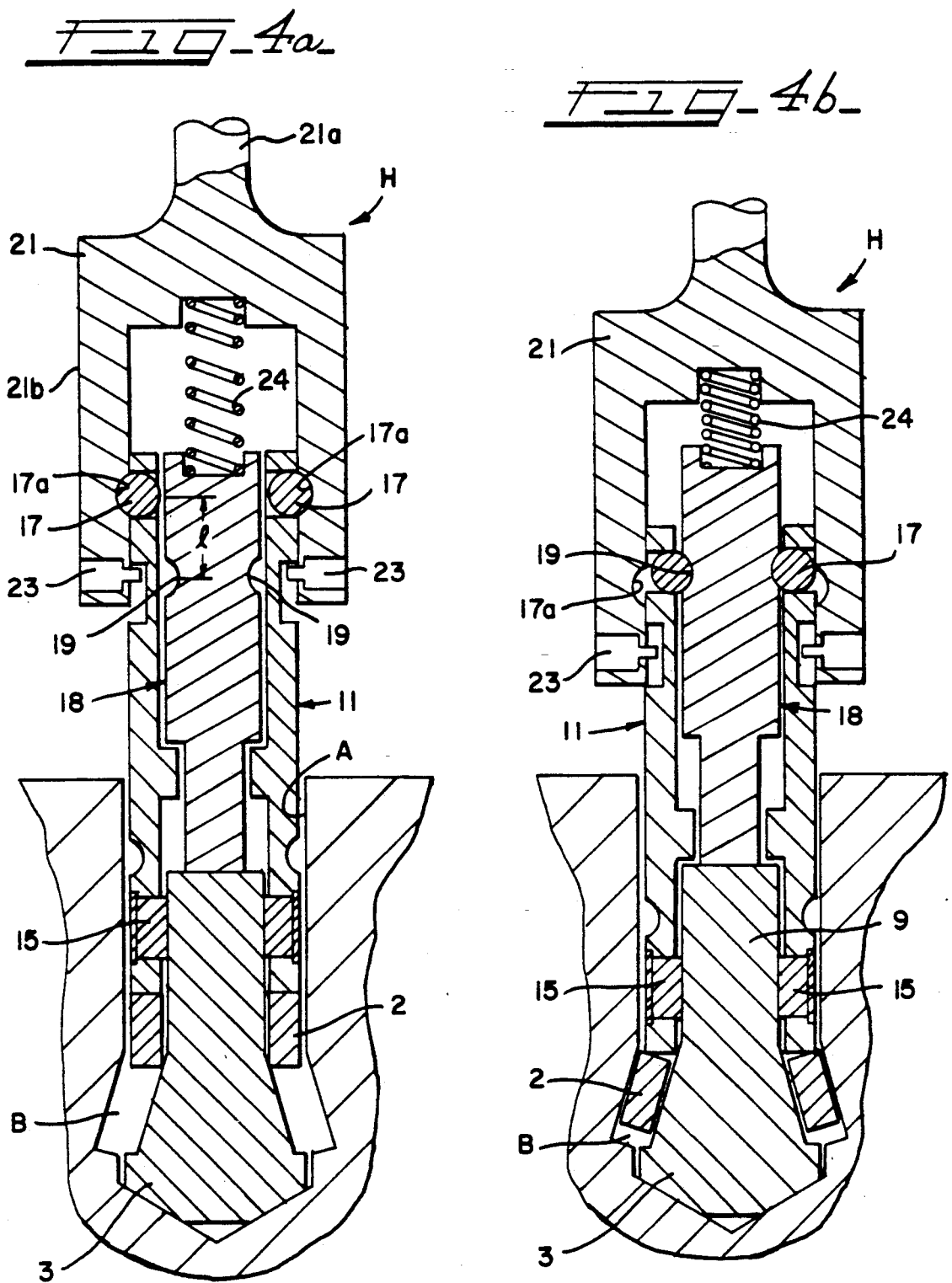

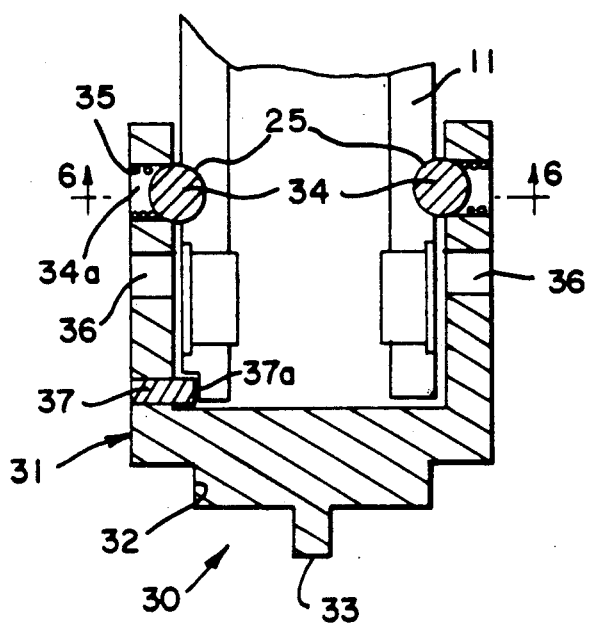
FIG-5-
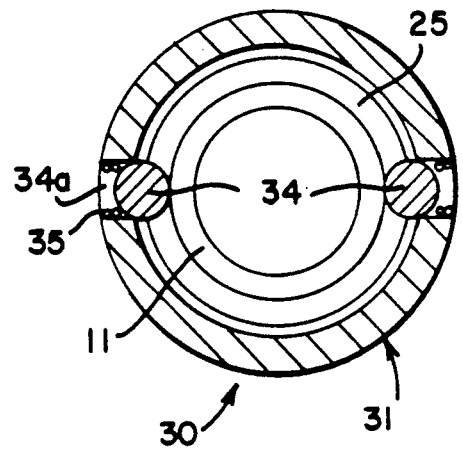
FIG-6-
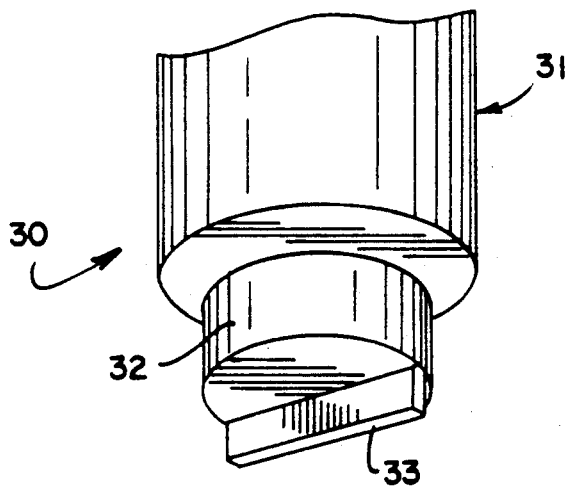
FIG-7-

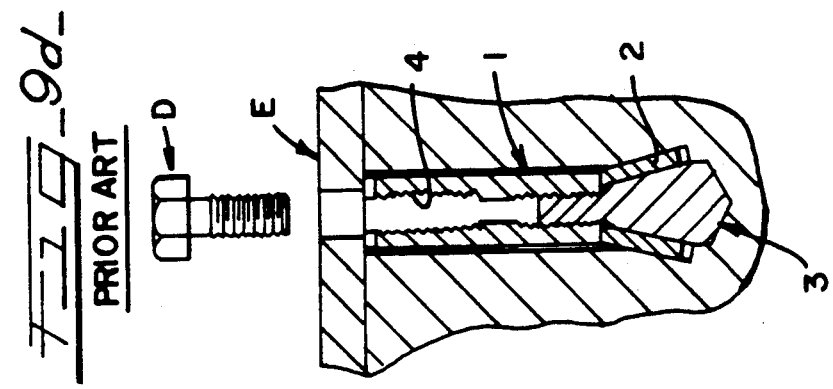
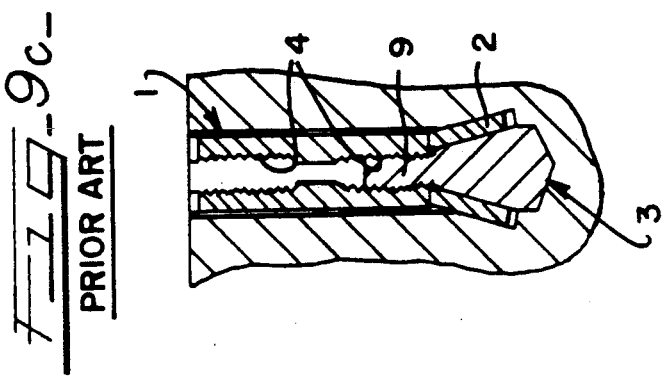
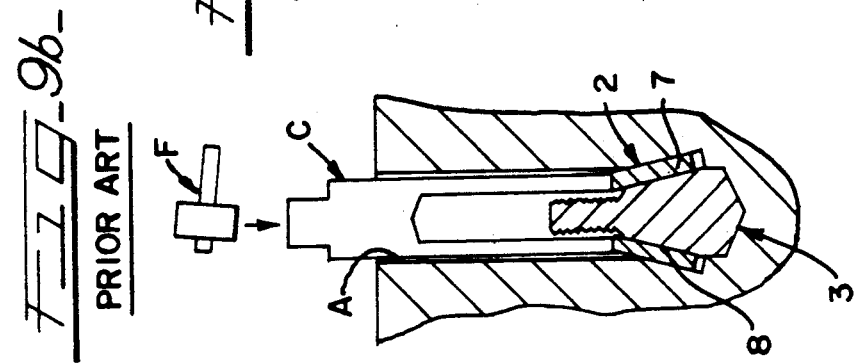
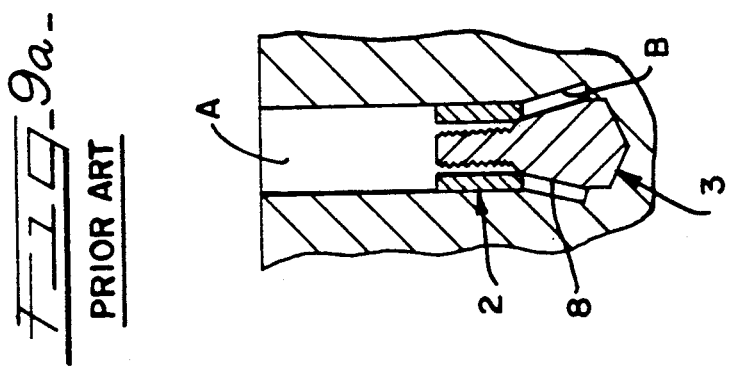
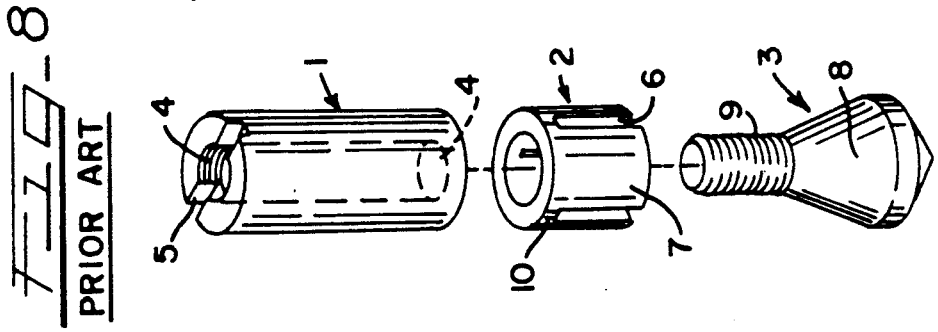

1

DRIVING MECHANISM FOR ANCHOR

FIELD AND BACKGROUND OF THE INVENTION

This invention relates to a driving device used for fixing an anchor, or embedded thread structure, in a hole having an undercut at its bottom end; more specifically it relates to a driving device for an expansion sleeve which is a component of the anchor.

An object may be fastened to a hard surface, such as a concrete wall or ceiling, by first installing an anchor in the hard surface and then attaching the object to the anchor. Anchors have been proposed in the past, one of which is shown in FIG. 8. There, the anchor includes a tubular main or tension sleeve 1 having a hole with internal threads 4 and a groove 5 in its outer end surface for engagement by a screw-driver; an expansion sleeve 2 which has slits 6 cut into it lengthwise to form expansion pieces 7; and an embedded bolt 3 comprising a threaded part 9 at its upper end which is engaged with the threaded hole 4, and a conical surface 8 at its lower end.

The conventional procedure for using this structure is described as follows with reference to FIGS. 9a to 9d. A hole A which has an undercut part B is drilled into a concrete surface, and the bolt 3 and then the expansion sleeve 2 are inserted so that the expansion sleeve 2 rests lightly on the tapered surface 8 of the bolt 3 in the undercut part of the hole (FIG. 9a). Next, a tubular driving bar C having a cylindrical part the diameter of which is the same as the expansion sleeve 2, is inserted into the hole. The lower end of the driving bar C is placed against the outer end surface of the expansion sleeve 2, and then the head of the bar C is struck with a hammer F. The thin-wall joint 10 (FIG. 8) at the base (the upper end) of each expansion piece 7 of the expansion sleeve 2 is bent, and each expansion piece 7 is expanded along the protruding tapered surface 8 of the embedded bolt 3, thus firmly securing the bolt in the hole A (see FIG. 9b). Next, the main sleeve 1 is inserted into the hole, and its interior thread 4 is engaged with the threaded end 9 of the bolt 3 (FIG. 9c).

When the tip of a screwdriver is inserted into the screwdriver engaging groove 5 and the screwdriver is turned to screw the main sleeve onto the bolt 3, the main sleeve 1 is moved into contact with the outer end surface of the expansion sleeve 2, and the main sleeve 1 is thus fixed in the hole (FIG. 9c). In this way, the anchor is provided inside the hole A, and the outer internal thread 4 of the main sleeve 1 may be used to fasten a structure E to the concrete surface by means of a fixing bolt D (FIG. 9d).

However, because a manual force is used for the driving mechanism (the driving bar C and the hammer f) as mentioned above, a fairly large amount of labor is required, the driving takes some time, and it is difficult to attain a constantly uniform driving force. If the driving force on the expansion sleeve 2 is not uniform, the expansion sleeve 2 may not be securely press-set to the hole wall, sometimes resulting in the bolt 3 not being firmly fixed. If the bolt 3 is not firmly fixed, of course, the securing fixing cannot be attained for the structure E which is to be mounted afterward on the anchor.

It is a general object of this invention to provide a driving device with which the expansion sleeve can be driven in, easily and securely, by a specific amount and without excessive labor.

SUMMARY OF THE INVENTION

Apparatus in accordance with this invention comprises a first part adapted to be positioned in engagement with an expander of an anchor bolt, a second part adapted to be engaged by a hammer drill, and a coupling between the first and second parts. The coupling includes a guide adapted to engage a bolt of the expander and a release normally connecting the second and first parts. The guide engages the release and holds the release in engagement with the first and second parts during driving operation but disengages the release after the expander has moved a preset distance relative to the bolt.

BRIEF DESCRIPTION OF THE DRAWINGS

The invention will be better understood from the following detailed description taken in conjunction with the accompanying figures of the drawings, wherein:

FIGS. 4a and 4b are views similar to FIG. 1, but showing the device in operation;

FIG. 5 is a fragmentary sectional view showing a driver attachment according to the invention;

FIG. 6 is a radial section taken along line 6—6 of FIG. 5;

FIG. 7 is a fragmentary perspective view of the attachment shown in FIG. 5;

FIG. 8 is an exploded perspective view of a conventional anchor;

FIGS. 9a to 9d are axial sections showing the installation and use of the conventional anchor.

DETAILED DESCRIPTION OF THE DRAWINGS

Figure 1:
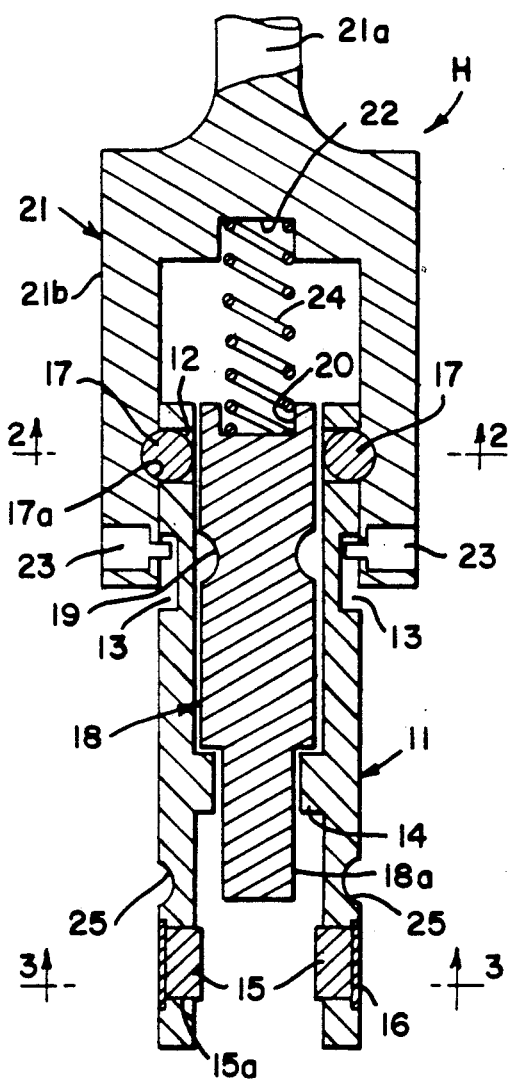
FIG. 1 is an axial sectional view of a driving device in accordance with the invention.

As shown in FIG. 1, a driving device H is composed of an outer driving body 21 that has a cylindrical outer part 21b; an inner driving cylinder 11 that is engaged in the outer part 21b; and an interior bar-like guide body 18 which is engaged within the inner cylinder 11.

A bar-like shank 21a on top of the outer driving body 21 is formed with a conventional hammer drill mounting part, where a hammer drill (not shown) is connected. On the lower end of the driving body 21 is mounted radial pins 23 which, being engaged with elongated slots or holes 13 provided in the outer surface of the inner driving cylinder 11, serve as a lock between the inner driving cylinder 11 and the body 21.

Figure 2:
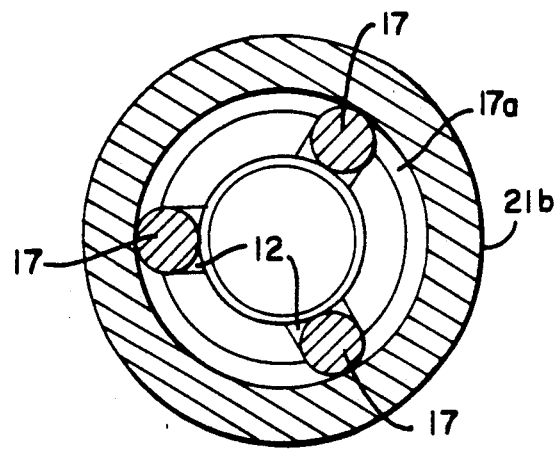
FIGS. 2 and 3 are radial cross sections taken along lines 2—2 and 3—3, respectively, of FIG. 1.

Slightly above the pins 23 is provided an internal circumferential groove 17a which has a semi-circular cross section, and steel balls 17 partially fit in the groove. The balls 17 (three in this specific example) are spaced around the circumference, as shown in FIG. 2. The circumferential groove 17a is provided, preferably along the overall inner surface of the cylindrical part 21b, and radial holes 12 are formed through the inner cylinder 11 at the matching position. A protruding part 14 is formed either continuously or intermittently along the circumference of the inner surface at about the center of the inner cylinder 11. Roller holes 15a (FIGS. 1 and 3) are formed through the lower end of the inner cylinder 11, and an axial roller 15 is housed inside each roller hole 15a. At the back of the rollers 15, a flat spring 16 is wound along the outer circumference of said inner cylinder 11.

Figure 3:
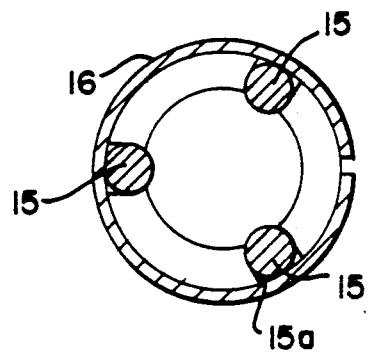

As shown in FIG. 3, each roller hole 15a is made so that its inner side is a bit smaller than the roller diameter so as to retain the roller 15 inside the hole 15a. Each roller 15 is mounted by being pressed into the inner side by means of the flat spring 16 which is behind it, and, under such conditions, the rollers 15 protrude slightly from the inner surface of the inner cylinder 11. Due to this structure, the inner surface of the inner driving cylinder 11 never slides against the thread 9 of the embedded bolt 3, thus preventing damage to the thread.

A recess 20 is provided in the upper end of the guide body 18, and a compression spring 24 is mounted between the recess 20 and a recess 22 provided on the upper inner side of the outer driving body 21. The cylindrical surface of the guide body 18 is provided with a circumferential groove 19 for engagement with the balls 17. The lower part of the guide body 18 is also formed with a reduced diameter part 18a so as to engage with the protruding part 14 of the inner cylinder 11, which limits the upward movement of the inner driving cylinder 11.

A driver-like attachment 30, which is designed to be attached to and detached from the driving device H, is shown in FIGS. 5-7. The attachment 30 comprises a shell 31 and a columnar part 32 which is smaller in diameter and provided with a protrusion 33 at the bottom. The upper end of the shell 31 is formed with holes 34a, each retaining a steel ball 34; a spring 35 is mounted in contact with each ball 34 on its outer side so as to press the ball 34 inwardly. During engagement with the driving device H, the balls 34 partially enter grooves 25 (FIG. 1) formed in the outer circumference surface at the lower part of the inner cylinder 11 of the driving device. A torque transmission pin 37 (FIG. 5), which is provided near the base of the shell 31, engages with a groove 37a formed at the lower end of the inner cylinder 11 so that the torque of the driving device H is transmitted to the attachment 30 via the pin 37. Holes 36 for inserting a retightening bar (not shown) are formed through the shell 31 adjacent the center.

The operation of the driving device is illustrated in FIGS. 4a and 4b. In FIG. 4a, the bolt 3 is inserted into a hole A and the expansion sleeve 2 rests in engagement with the conical surface of the bolt 3. In this condition, the lower end of the inner cylinder 11 is inserted into the hole A so that its lower tip contacts the upper end of the expansion sleeve 2, and at the same time the lower end of the guide body 18 contacts the upper end of the bolt 3. Then, the expansion sleeve 2 is driven by a hammer drill which is attached to the shank 21a but is not shown. The driving force of the hammer drill is transmitted from the outer body 21 to the inner cylinder 11 via the balls 17. The inner cylinder 11 drives the expansion sleeve 2 while sliding over and being guided by the guide body 18. The rollers 15 also compressively engage the threads of the bolt 3.

As shown in FIG. 4b, when the balls 17 reach the position of the outer circumferential groove 19 of the guide body 18 with the expansion sleeve 2 expanded and press-set in the undercut part B, the balls 17 are pushed radially inwardly, sliding into the groove 19, by means of the radial or horizontal component of force being applied to the spherical surface of the balls 17 due to the vertical force of the outer body 21. Then, the driving engagement of the outer body 21 and the inner cylinder 11 is released, and the driving force of the hammer drill is no longer transmitted to the inner cylinder 11.

In this condition, the spring 24 is compressed. Thus, the expansion sleeve 2 is driven downwardly by the distance equivalent to the amount of vertical transfer 1 of the balls 17, i.e. the vertical distance 1 between the circumferential grooves 17a and 19 when in the at-rest position shown in FIG. 4a. This makes it possible to consistently secure a preset amount of driving. Further, during driving operation, the rollers 15 compressively contact the thread 9 so as to prevent the thread from being damaged.

After being used to drive the expansion sleeve 2 for a preset amount as described above, the driving device H is pulled out of the hole A. At that time the lower end of the guide body 18 is released from restriction due to contact with the upper end of the bolt 3, leaving it free to move downwardly, and the radial component of force on the balls 17 due to the vertical force as the spring 24 expands to its original condition, is applied to the balls 17, and the balls once again move out of the groove 19 and enter the groove 17a of the outer body 21. The outer body 21 moves upwardly accompanied by the inner shell 11, resuming the original condition shown in FIG. 4a.

After the driving device H is removed upon completion of driving the expansion sleeve 2, the driver attachment 30 (FIG. 5-7) is engaged with the device H. At the same time, the main sleeve 1 of the anchor (FIG. 8) is inserted into the hole A, the protrusion or blade 33 of the attachment is inserted into the groove 5 of sleeve, and the hammer drill is now rotated to engage the main sleeve 1 with the bolt 3. Finally, the driving device H is removed from the attachment 30 and a retightening bar (not shown) is inserted in the holes 36 of attachment 30 so as to manually retighten the main sleeve 1, so that the main sleeve 1 is engaged with and secured to the bolt 3.

As explained above, by using the driving device according to this invention, since a preset amount of driving can be secured for the expansion sleeve, the expansion sleeve can be securely press-set in the undercut part of the hole, so that the bolt can also be secured firmly.

Furthermore, since it is not necessary to use manual labor, such as striking a driving bar with a hammer as was necessary before, the driving can be performed promptly and with little labor.

Further, since the engagement of the main sleeve with the embedded bolt can be realized using mechanical force by attaching the driver-like attachment to the driving device, engagement can be attained securely with little labor, in addition to allowing retightening by using a retightening bar.

What is claimed is:

1. Apparatus for driving an expander relative to an anchor bolt in a hole having an undercut portion, said apparatus having a forward end and a rearward end, comprising an outer member having a rearward portion for connection with a hammer drill and having a forward tubular portion which is open at said forward end, said tubular portion having an interior recess in its inner axial surface, an inner tubular member telescopically engaged within said tubular portion and adapted to engage at said forward end with one end of the expander, said inner tubular member having a radial hole through it, a ball held in said hole and movably radially of said hole and having a diameter larger than the thickness of said inner tubular member, a columnar guide member telescopically engaged within said inner tubular member, means coupling said guide member and said inner tubular member for limiting relative axial movement, and adapted to engage at said forward end with the outer end of the bolt, said guide member having an outer recess in its axially extending surface, and resilient means between said outer member and said columnar guide member for forwardly urging said guide member, said inner recess and said radial hole being normally aligned radially with each other, and said outer recess being normally displaced in a fixed distance forwardly from said hole, so that said ball normally engages with said inner recess to connect said outer and inner members in driving relation, and when said outer member has moved with said inner member said distance forwardly relative to said guide member, said radial hole and said outer recess are radially aligned with each other, so that said ball may move out of said inner recess and into said outer recess.

2. Apparatus according to claim 1, and further comprising means for engaging said outer and inner members in rotating connection with each other, and
driver means for screwing onto the anchor bolt a tension sleeve having an end groove, said driver means being adapted for rotating connection at one end with the forward end of said inner tubular member, said driver means having a tooth at the other end for engagement with said groove.

3. Apparatus according to claim 2, wherein said driver means further comprises a tubular portion for connection with said inner tubular member, said tubular portion having a hole for engagement with a retightening bar.

4. Apparatus for use in setting an anchor in a hole, the anchor including a bolt at the bottom of the hole and an expansion sleeve on the bolt, said apparatus comprising a first part adapted to be positioned in engagement with the expander, a second part adapted to be engaged by driving means, and coupling means between said first and second parts, said coupling means comprising a guide adapted to engage the bolt and release means normally connecting said first and second parts, said guide engaging said release means and holding said release means in engagement with said first and second parts during driving operation but disengaging said release means when said expander and said first part have moved a preset distance relative to the bolt and said guide.

* * * * *